US006178399B1

(12) United States Patent
Takebayashi et al.

(10) Patent No.: US 6,178,399 B1
(45) Date of Patent: Jan. 23, 2001

(54) TIME SERIES SIGNAL RECOGNITION WITH SIGNAL VARIATION PROOF LEARNING

(75) Inventors: Yoichi Takebayashi, Yokohama; Hiroshi Kanazawa, Ebina; Hiroyuki Chimoto, Yokohama, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/427,272

(22) Filed: Apr. 24, 1995

Related U.S. Application Data

(63) Continuation of application No. 08/115,706, filed on Sep. 3, 1993, now abandoned, which is a continuation of application No. 07/908,514, filed on Jun. 26, 1992, now abandoned, which is a continuation of application No. 07/492,451, filed on Mar. 13, 1990, now abandoned.

(30) Foreign Application Priority Data

Mar. 13, 1989 (JP) .................................................. 1-057878

(51) Int. Cl.[7] .................................................. G10L 15/00
(52) U.S. Cl. .......................................... 704/233; 704/244
(58) Field of Search ................................. 381/41–43, 46, 381/47; 395/2.42, 2.53; 704/233, 244, 226, 243, 251–154

(56) References Cited

U.S. PATENT DOCUMENTS

| 4,100,370 | * | 7/1978 | Suzuki | 381/42 |
| 4,481,593 | * | 11/1984 | Bahler | 364/513.5 |
| 4,720,802 | | 1/1988 | Damoulakis et al. | 364/513.5 |
| 4,783,802 | * | 11/1988 | Takebayoshi | 395/2.42 |
| 4,852,181 | * | 7/1989 | Morito et al. | 395/2.42 |

FOREIGN PATENT DOCUMENTS 178 509   9/1985 (EP) .

OTHER PUBLICATIONS

C.Lee, et al., IEEE Int'l Conference on Acoustics Speech and Signal Processing, "Speech Recognition Under Additive Noise", vol. 3, Mar. 19, 1984, pp. 3571–3572.

The ICAASP Space 84 Proceedings, Mar. 19–21, 1984, pp.3573–3574.

David Roe, IEEE Int'l Conference on Acoustics Speech and Signal Processing, "Speech Recognition with a Noise–Adapting Codebook", vol. 2, Apr. 6, 1987, pp.1139–1140.

D.Paul, et al., Speech Tech '86, "Robust HHM Based Techniques for Recognition of Speech Produced Produced Under Stress and in Noise", vol. 1, No. 3, Apr. 28, 1986, pp. 241–242.

* cited by examiner

Primary Examiner—David D. Knepper
(74) Attorney, Agent, or Firm—Foley & Lardner

(57) ABSTRACT

Time series signals are recognized by extracting a multiplicity of candidate feature vectors characterizing an individual time series signal without fixing a boundary for the individual time series signal, and calculating similarity values for each of the multiplicity of candidate feature vectors and the reference patterns stored in the recognition dictionary, from which one reference pattern for which the similarity value is greater than a prescribed threshold value is selected as a recognition result. New reference patterns to be stored in the recognition dictionary are learned by artificially synthesizing signal patterns with variations for learning; extracting feature vectors for learning from the recognition results and the similarity values obtained by the recognizing step from the signal patterns with variations for learning; and obtaining new reference patterns from the feature vectors for learning extracted by the extracting step.

15 Claims, 8 Drawing Sheets

TIME SERIES SIGNAL RECOGNITION WITH SIGNAL VARIATION PROOF LEARNING

This application is a continuation of application Ser. No. 08/115,706, filed Sep. 3, 1993, now abandoned; which is a continuation of application Ser. No. 07/908,514, filed Jun. 26, 1992, now abandoned; which is a continuation of application Ser. No. 07/492,451, filed Mar. 13, 1990, now abandoned.

BACKGROUND OF THE INVENTION

1. Field of the Invention

The present invention relates to an apparatus for recognizing time series signals, such as human speech and other acoustic signals.

2. Description of the Background Art

Conventionally, a time series signal recognition, such as speech recognition, has been achieved basically by first performing a so called segmentation in which a word boundary is detected in the time series signals, and then look for a matching between a reference pattern in a speech recognition dictionary and a word feature parameter extracted from the signal within the detected word boundary. There are several speech recognition methods which falls within this category of the prior art, which includes DP matching, HMM (Hidden Markov Model), and the Multiple Similarity (partial space) method.

However, in more realistic noisy environments there has been a problem in practice that many recognition errors due to failure of the appropriate word boundary detection as are due to false pattern matching.

Namely, the detection of the word boundary has conventionally been performed with energy or pitch frequency as a parameter, so that highly accurate recognition tests can be performed in a quiet experiment room. But, the recognition rate drastically decreases for more practical locations for use, such as inside offices, cars, stations, or factories.

To cope with this problem, there has been a proposition of a speech recognition method, called a word spotting (continuous pattern matching) method, in which the word boundary is taken to be not fixed but flexible, but this method is associated with another kind of recognition error problem.

This can be seen from the diagram of FIG. 1 in which an example of time series for an energy of a signal is depicted along with indications for three different noise levels. As shown in FIG. 1, the word boundary for this signal progressively gets narrower as the noise level increases from N1 to N2 and to N3, which are indicated as intervals (S1, E1), (S2, E2), and (S3, E3), respectively. However, the speech recognition dictionary is usually prepared by using the word feature vectors obtained by using the specific word boundaries and the specific noise level, so that when such a conventional speech recognition dictionary is used with the word spotting method, the matching with the word feature vector obtained from an unfixed word boundary for a speech mixed with noise having a low signal/noise ratio becomes troublesome, and many recognition errors occur.

On the other hand, for a speech recognition method using a fixed word boundary, there is a learning system for a speech recognition dictionary in which the speech variations are taken into account artificially, but no effective learning system is known for the word spotting method, so that the word spotting method has been plagued by the problem of excessive recognition errors.

Thus, although sufficiently high recognition rate has been obtainable for experiments performed in a favorable noiseless environment, such as an experimental room, conducted by an experienced experimenter, a low recognition rate resulted in a more practical noisy environment with an inexperienced speaker because of errors in word boundary detection. This has been a major obstacle for realization of a practical speech recognition system. Furthermore, the speech recognition dictionary and the word boundary detection have been developed rather independent of each other, so that no effective learning system has been known for the speech recognition method using an unfixed word boundary, such as the word spotting method.

It is also to be noted that these problems are relevant not only for speech recognition, but also to the recognition of other time series signals, such as vibrations or various sensor signals.

SUMMARY OF THE INVENTION

It is therefore an object of the present invention to provide a method and an apparatus for time series signal recognition capable of obtaining a high recognition rate even in noisy environments in which the signals are subjected to rather large variations.

According to one aspect of the present invention, there is provided an apparatus for time series signal recognition, comprising: means for inputting signal patterns for time series signals to be recognized; means for recognizing the time series signals, including: means for extracting a multiplicity of candidate feature vectors characterizing individual time series signal from the signal pattern, without fixing a boundary for individual time series signal in the signal patterns; recognition dictionary means for storing reference patterns with which the individual time series signals are matched; means for calculating similarity values for each of the multiplicity of candidate feature vectors and the reference patterns stored in the recognition dictionary means; means for determining a recognition result by selecting reference patterns stored in the recognition dictionary means for which the similarity value calculated by the calculating means is greater than a prescribed threshold value; and means for learning new reference patterns to be stored in the recognition dictionary means, including: means for artificially synthesizing signal patterns with variations for learning to be given to the recognizing means; means for extracting feature vectors for learning from the recognition results and the similarity values obtained by the recognizing means from the signal patterns with variations for learning; and means for obtaining the new reference patterns from the feature vectors for learning extracted by the extracting means.

According to another aspect of the present invention there is provided a method of time series signal recognition, comprising the steps of: inputting signal patterns for time series signals to be recognized; recognizing the time series signals, including the steps of: extracting a multiplicity of candidate feature vectors characterizing individual time series signal from the signals pattern, without fixing a boundary for individual time series signal in the signal patterns; storing reference patterns with which the individual time series signals are matched in recognition dictionary means; calculating similarity values for each of the multiplicity of candidate feature vectors and the reference patterns stored in the recognition dictionary means; and determining a recognition result by selecting reference patterns stored in the recognition dictionary means, for which the similarity value calculated at the calculating step is greater than a prescribed threshold value; and learning new reference patterns to be stored in the recognition dictionary means, including the steps of: artificially synthesizing signal patterns with variations for learning to be given to the recognizing step; extracting feature vectors for learning from the recognition results and the similarity values obtained by the recognizing step from the signal patterns with variations for learning; and obtaining the new reference patterns from the feature vectors for learning extracted by the extracting step.

Other features and advantages of the present invention will become apparent from the following description taken in conjunction with the accompanying drawings.

DETAILED DESCRIPTION OF THE PREFERRED EMBODIMENTS

Figure 1:
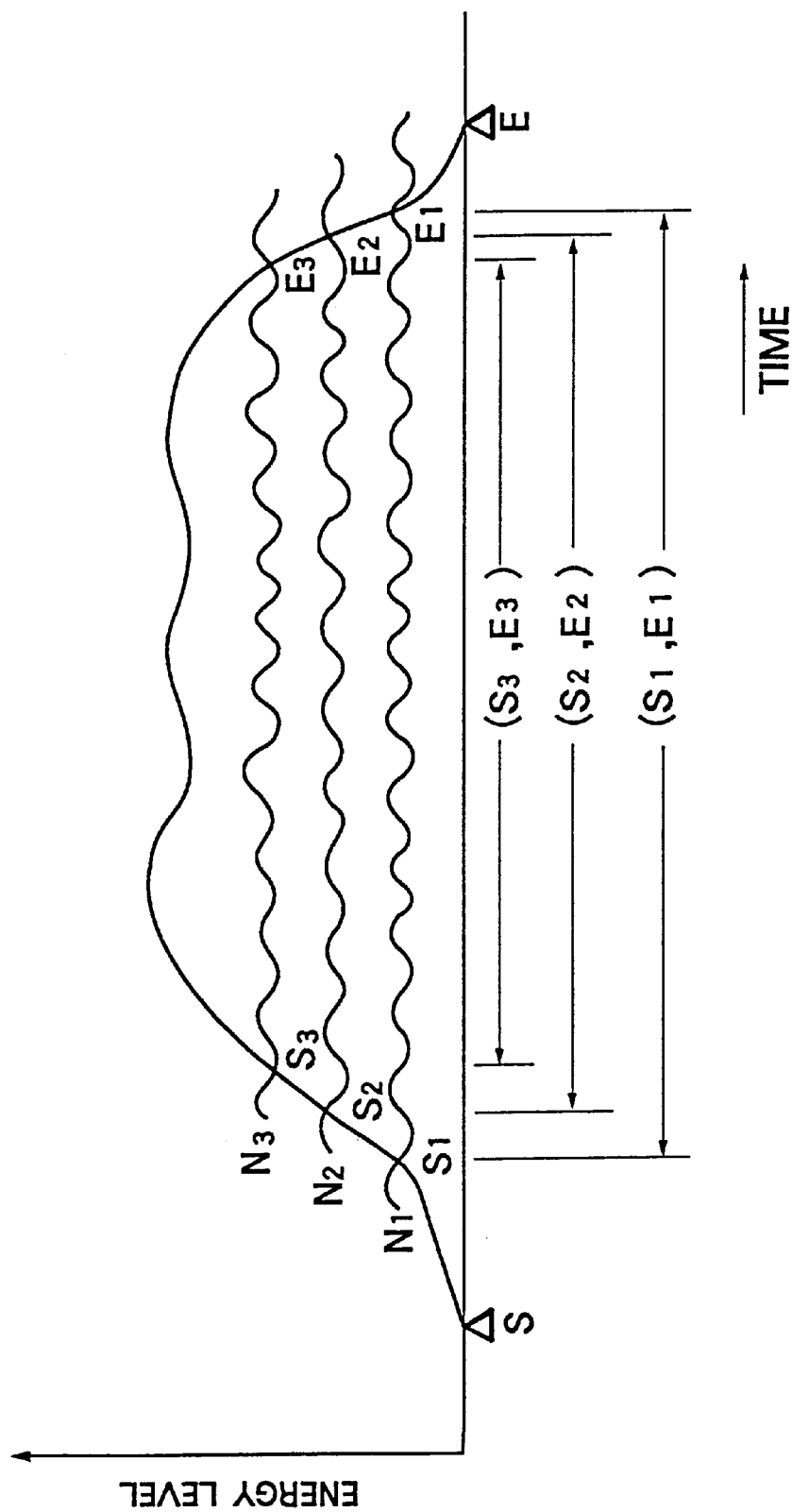
FIG. 1 is a diagram for the explaining a problem of speech recognition related to a speech recognition dictionary for word spotting method in a conventional speech recognition apparatus.
Figure 2:
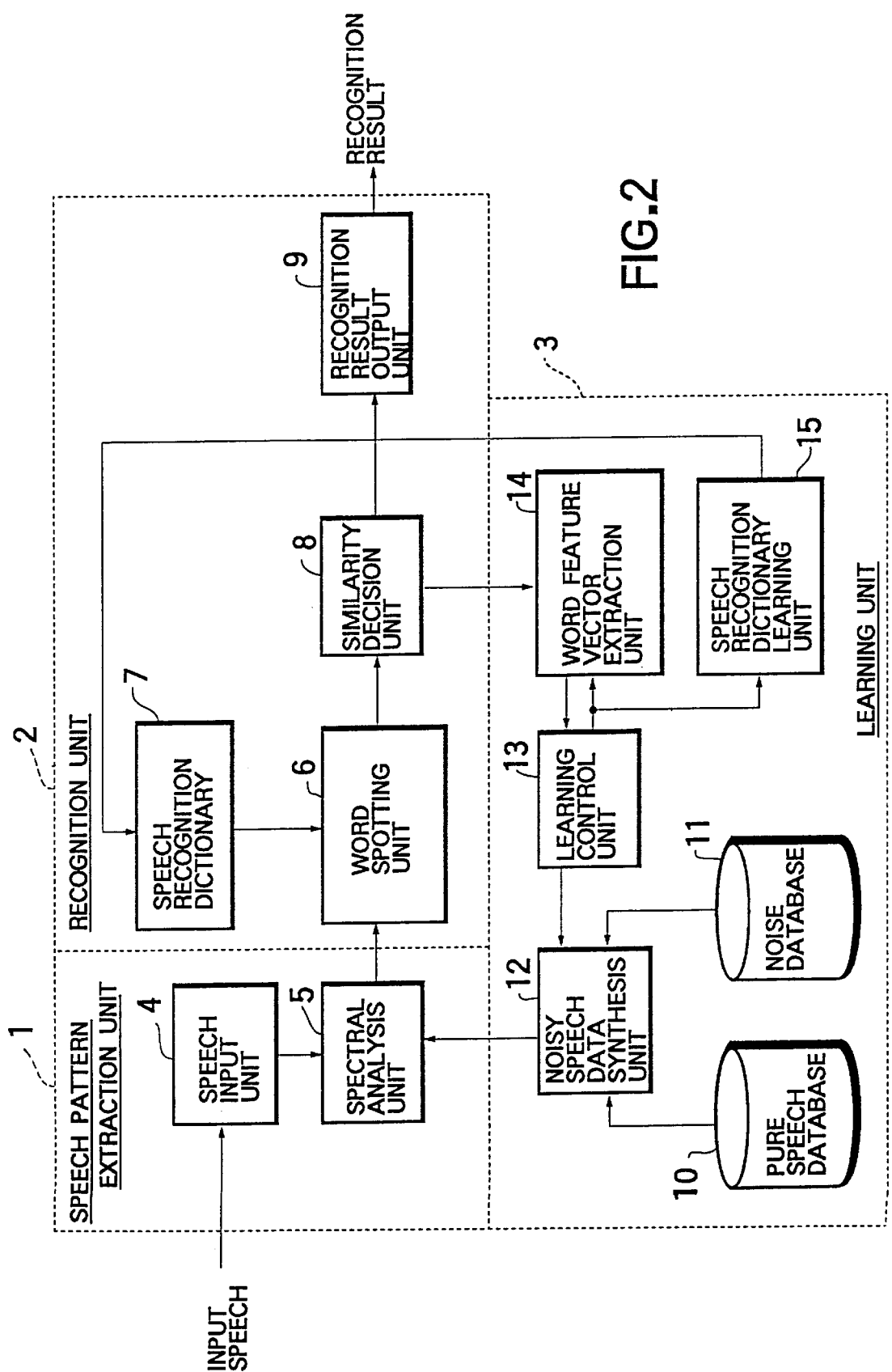
FIG. 2 is a block diagram for one embodiment of a time series recognition apparatus, according to the present invention.

Referring now to FIG. 2, there is shown one embodiment of a time series recognition apparatus according to the present invention, in the form of a speech recognition apparatus.

In this embodiment, the apparatus generally comprises a speech pattern extraction unit 1, a recognition unit 2, and a learning unit 3, and operates in the two operational modes of a speech recognition mode and a learning mode.

The speech pattern extraction unit 1 comprises a speech input unit 4 for receiving input speech to be given to the apparatus, and a spectral analysis unit 5 for analyzing the spectrum of the input speech to extract parametrized speech pattern to be recognized by the recognition unit 2.

The recognition unit 2 comprises a word spotting unit 6 for obtaining word feature vectors from the extracted speech pattern and calculating the similarity values for the obtained word feature vectors, a speech recognition dictionary 7 for storing reference patterns with respect to which matching of the obtained word feature vectors are to be sought, a similarity decision unit 8 for determining a recognition result in accordance with the matching made at the word spotting unit 6, and a recognition result output unit 9 for outputting the determined recognition result.

Figure 3:
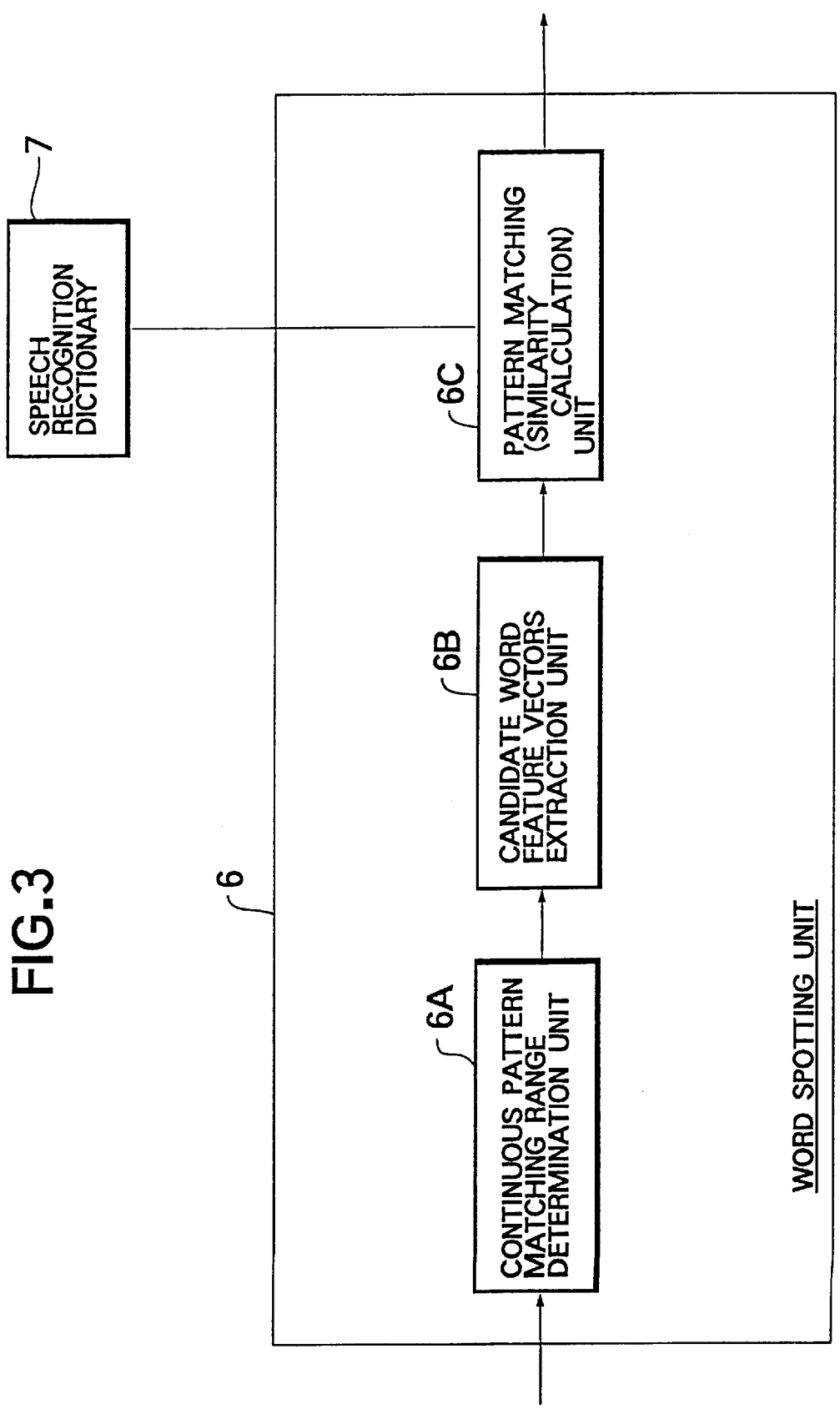
FIG. 3 is a block diagram for a word spotting unit of the apparatus of FIG. 2.

As shown in FIG. 3, the word spotting unit 6 further comprises a continuous pattern matching range determination unit 6A for determining a range for each pattern matching to be made, a candidate word feature vectors extraction unit 6B for extracting a multiplicity of candidate word feature vectors within each determined range, and a pattern matching (similarity calculation) unit 6C for calculating the similarity values.

Referring back to FIG. 2, the learning unit 3, which is utilized in the learning mode only, comprises a pure speech database 10 for storing noiseless speech data for learning, a noise database 11 for storing noise data for learning, to be mixed with the noiseless speech data, a noisy speech data synthesis unit 12 for mixing the noiseless speech data and the noise data to obtain noisy speech data for learning, a learning control unit 13 for controlling the learning process, a word feature vector extraction unit 14 for obtaining the word feature vector of the maximum similarity value as a word feature vector for learning, and a speech recognition dictionary learning unit for obtaining a reference pattern to be stored in the speech recognition dictionary 7 from the word feature vector of the maximum similarity value obtained by the word feature vector extraction unit 14.

The function of each element enumerated above will become apparent from the following description of the speech recognition and learning modes of operations of the apparatus.

Now, the operation of this apparatus in the speech recognition mode will be described.

In the speech recognition mode, the input speech is transmitted through a microphone (not shown) to the speech input unit 4, and the parametrized speech pattern is extracted from this input speech at the spectral analysis unit 5 by using such data processing operations as FFT (fast Fourier transform), filter analysis, LPC (linear predictive coding) analysis, and cepstrum processing. This extraction of the parametrized speech pattern can be performed, for example, by deriving a pattern parametrized by a particular characteristic parameter of the input speech, such as pitch frequency, using a 16 channel filter bank output taken at a constant time interval (8 msec, for instance). Such a 16 channel filter bank output is transmitted to the recognition unit 2 at every frame period (8 msec, for instance).

At the recognition unit 2, matching between the reference patterns in the speech recognition dictionary 7 and the word feature vectors is made in the following manner.

Figure 4:
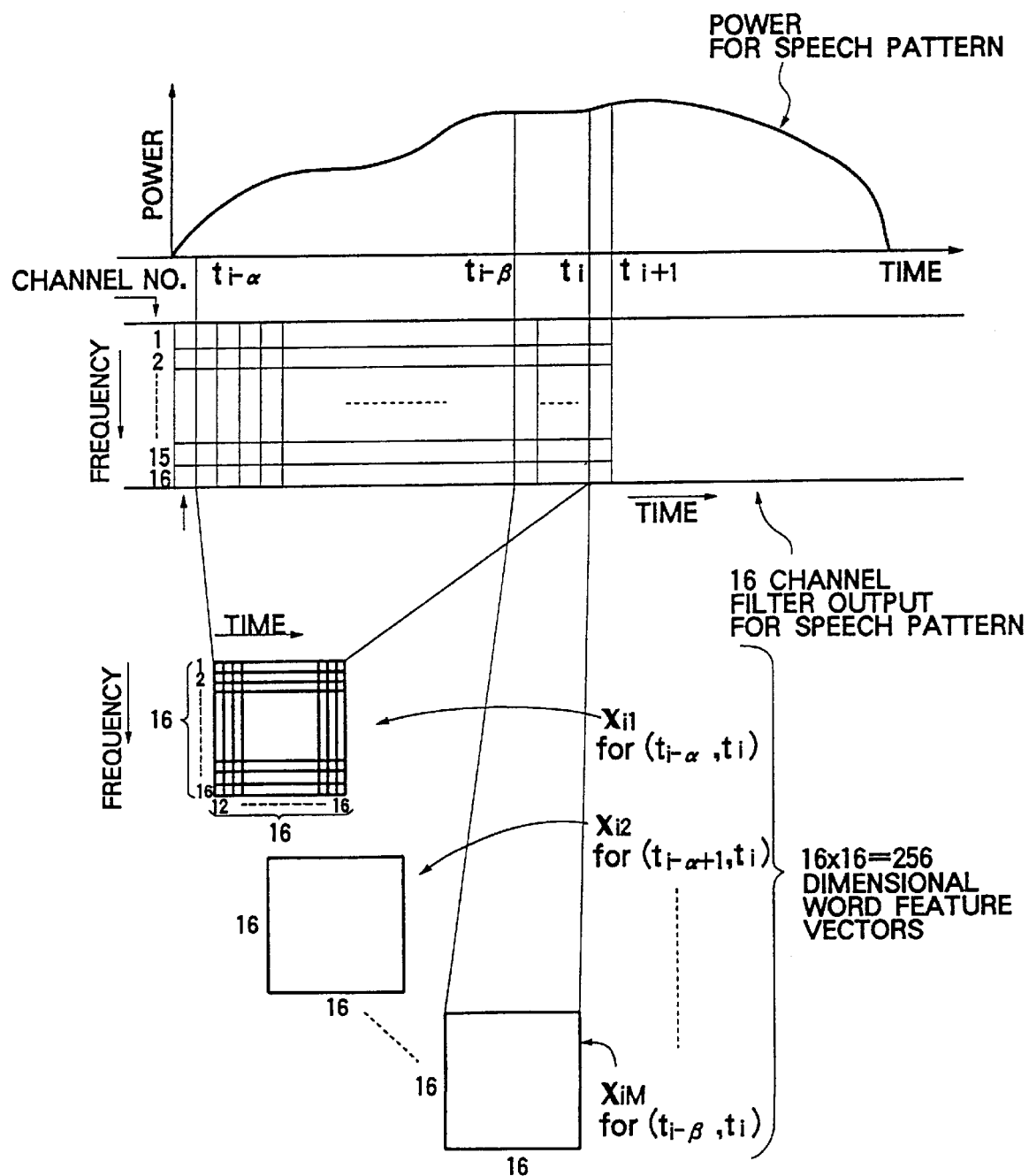
FIG. 4 is a diagrammatic illustration of input speech, speech pattern and word feature vectors utilized in the apparatus of FIG. 2, for explaining extraction of the word feature vectors.

First, the continuous pattern matching range, determination unit 6A determines a range for the matching and the candidate word feature vectors extraction unit 6B extracts a multiplicity of the candidate word feature vectors from the speech pattern represented by the filter bank output within the determined range, without fixing the word boundary. This is done, as shown in FIG. 4, by extracting a multiplicity (M in number) of candidate word feature vectors $X_{i1}$, $X_{i2}$, ... $X_{iM}$ with each point (M points in total) between a time $t_{i-\alpha}$ and a time $t_{i-\beta}$ taken as a starting point for one ending time $t_i$. Thus, M candidate word feature vectors are extracted for each $t_i$, as a time $t_i$ progresses along the time axis. Here, each candidate word feature vector $X_{ij}$ (j=1, 2, ... , M) is obtained by sampling at 16 points along the time axis, so that each candidate word feature vector $X_{ij}$ is given as a 16 (channel)×16 (sampling)=256 dimensional vector quantity.

Then, at the pattern matching (similarity calculation) unit 6C, the similarity values are calculated for words in the speech recognition dictionary 7 and each of the extracted candidate word feature vectors $X_{ij}$. Here, as a measure of similarity, a statistical distance measure, such as a multiple similarity or a Mahalanobis distance, or else a method such as a subspace method or neural network, may be utilized. In the case of a multiple similarity, a similarity value between a word l in the speech recognition dictionary 7 and a particular word feature vector $X_{ij}$ is given by the expression:

$$S_{ij}^{(l)} = \sum_{m=1}^{M} a_m^{(l)} (X_{ij}, \Phi_m^{(l)})^2$$

where $a_m^{(l)}$ is an eigenvalue for the word l, and $\Phi_m^{(l)}$ is an eigenvector for the word l.

Next, at the similarity decision unit 8, the recognition result is determined by selecting such words in the speech recognition dictionary 7 for which the similarity value is found in a prescribed time span (such as 0.3 see for instance) to be greater than a prescribed threshold similarity value $S_T$ set to be smaller than a maximum similarity value (a maximum similarity value times 0.8, for instance) as the recognition result to be given to the recognition result output unit 9. Note that once the recognition result is obtained, the start and end points $t_i$ and $t_j$ can be ascertained as well from the i and j labels of the selected similarity value $S_{ij}^{(l)}$.

Other methods of obtaining the similarity values and determining the recognition result are known and may be substituted for the particular ones described above.

Figure 5:
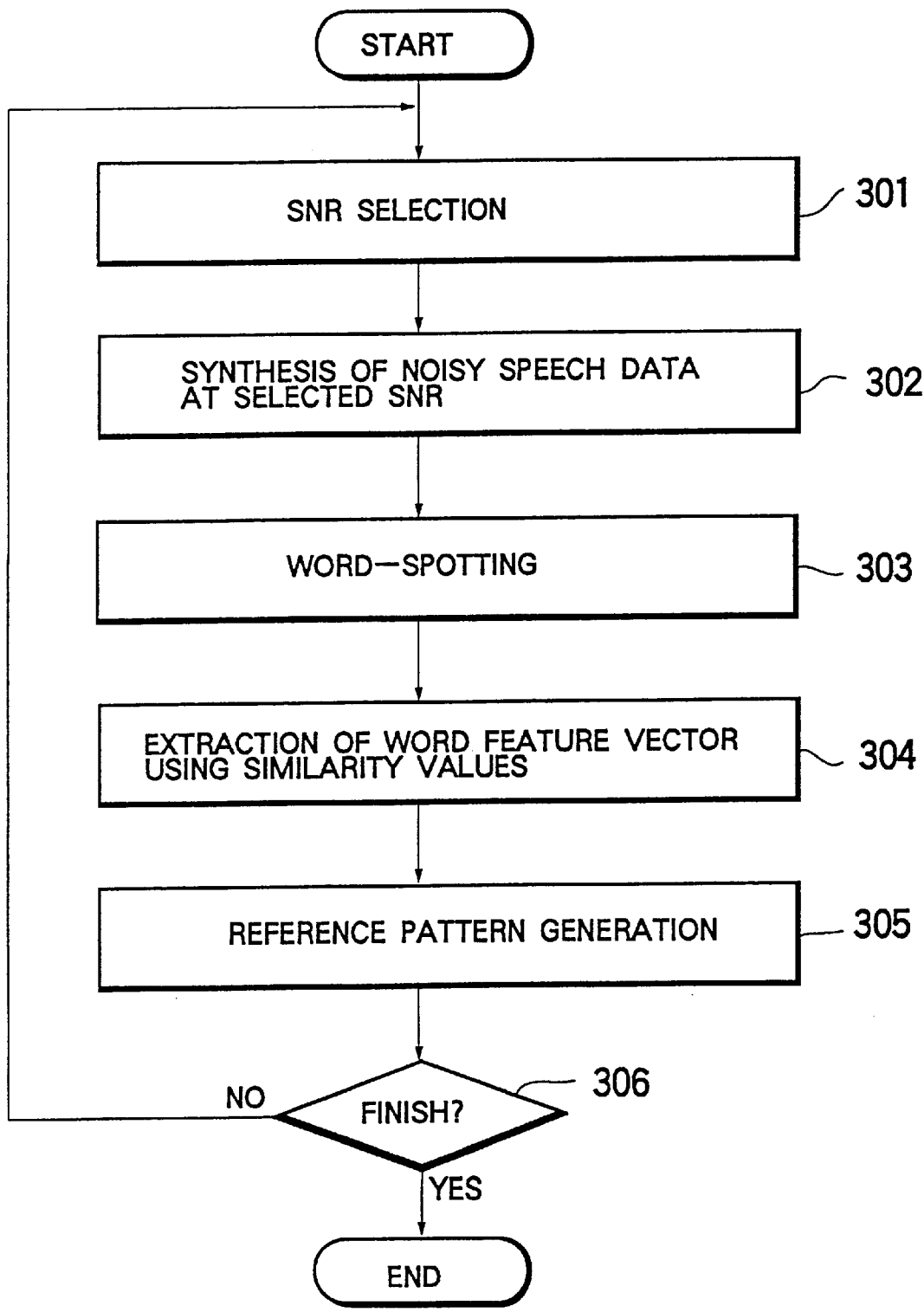
FIG. 5 is a flow chart for the learning process of the apparatus of FIG. 2.

Now, the operation of this apparatus in the learning mode will be described. In this embodiment, the operation in the learning mode is carried out according to the flow chart of FIG. 5 as follows.

Figure 6:
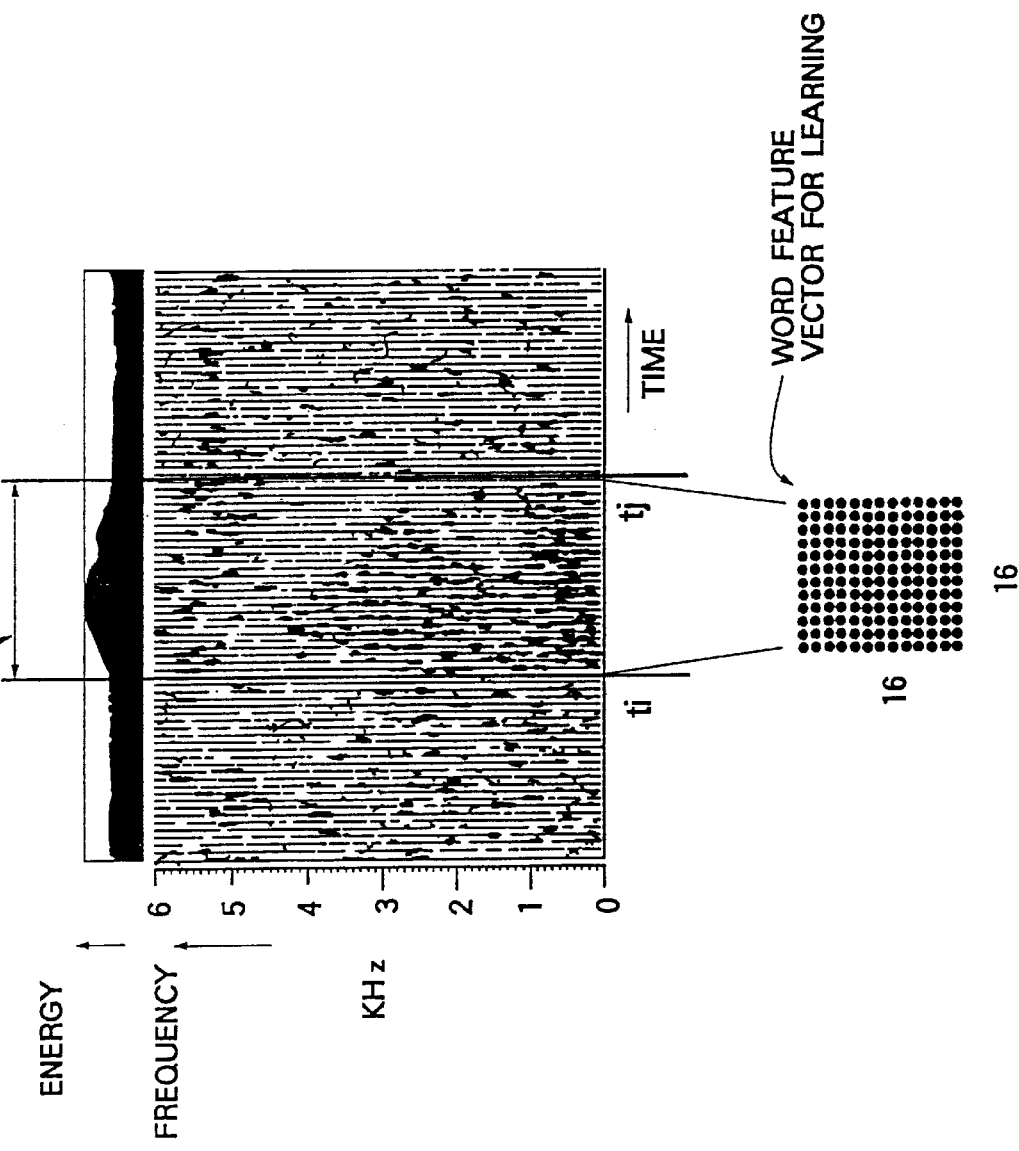
FIG. 6 is a diagrammatic illustration of speech data utilized in the apparatus of FIG. 2, for explaining the extraction of a word feature vector for learning.

In the learning mode, first a particular ratio (SNR) is selected at the noisy speech data synthesis unit 12 under control of the learning control unit 13 at the step 301, and then the noiseless speech data stored in the pure speech database 10 and the noise data stored in the noise database 11 are mixed at the speech data synthesis unit 12 at the selected signal/noise ratio at the step 302. The synthesized noisy speech data are then given to the recognition unit 2 through the spectral analysis unit 5, and subjected to the word spotting operation at the word spotting unit 6, as described above for the recognition mode. The similarity values resulting from the word spotting operation are then given to the similarity decision unit 8 as in the recognition mode, so as to determine the recognition result. The obtained recognition result is then given to the word feature vector extraction unit 14 at which the word feature vector corresponding to the similarity value of the recognition result is extracted as a word feature vector for learning, as shown in FIG. 6, at the step 304. The extracted word feature vector for learning is then given to the speech recognition dictionary learning unit 15 through the learning control unit 13 at which the reference pattern to be stored in the speech recognition dictionary 7 is obtained on a basis of the word feature vector for learning at the step 305. In a case where multiple similarity is used, this is done by modifying a so called covariance matrix $K^{(l)}$ for each word l according to the formula:

$$K^{(l)} = K_\phi^{(l)} + \alpha \Sigma X^{(l)} X^{(l)T}$$

where $K_{100}^{(l)}$ is an original covariance matrix before modification, $\alpha$ is a coefficient, $X^{(l)}$ is a word feature vector for learning, and $X^{(l)T}$ is a transpose of $X^{(l)}$, then performing a so called KL (Karhounen-Loere expansion (principal component analysis) to obtain an eigenvector $\Phi$ for each word l. This completes one cycle of the learning process.

Figure 7:
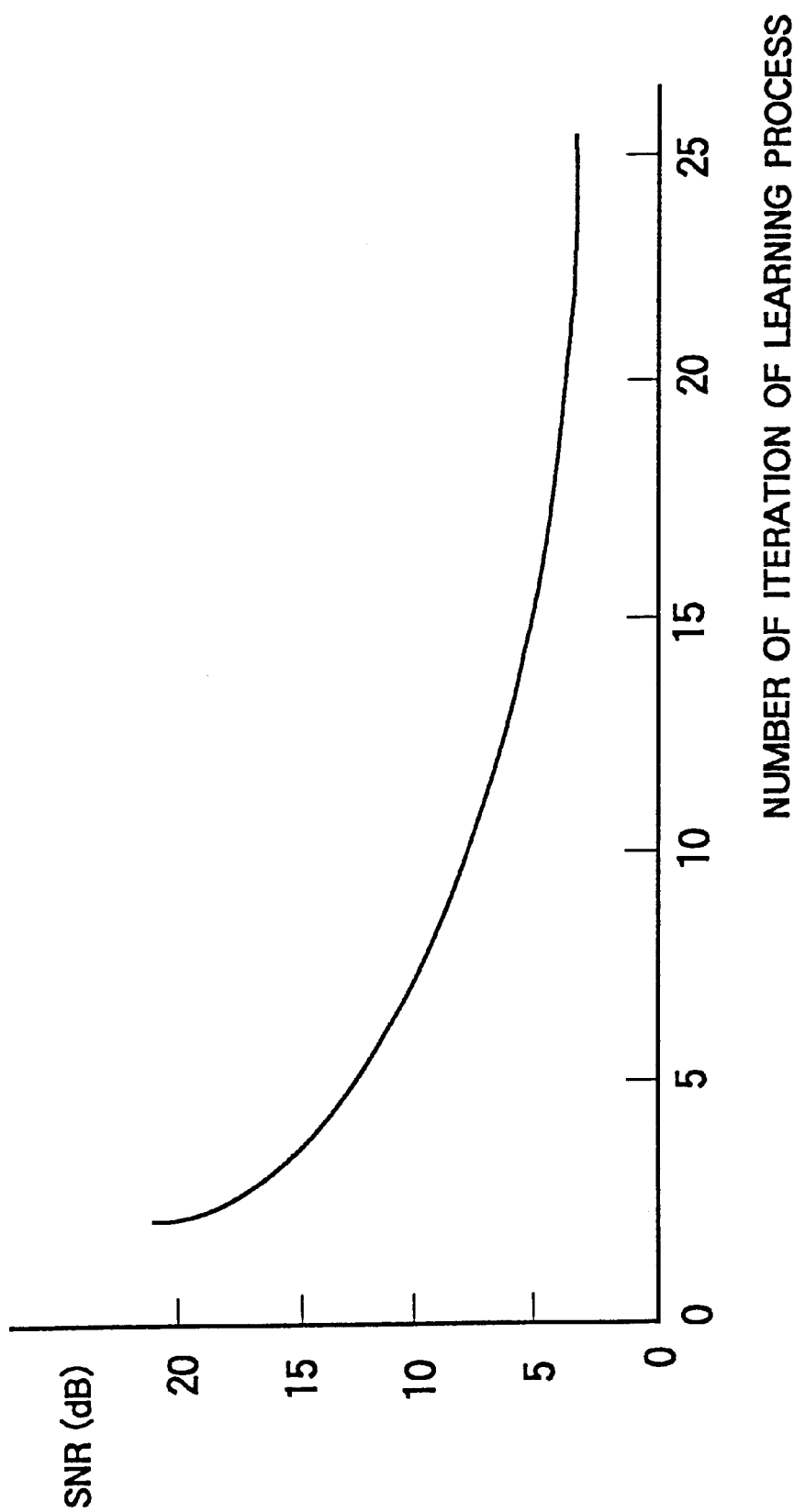
FIG. 7 is a graph of signal/noise ratio with respect to a number of iterations of the learning process to be utilized by the apparatus of FIG. 2.

Now, in this embodiment, very effective improvement of the learning process can be achieved by iterating such a learning process as described above for a number of different noise levels. By such iterations with gradually varying noise levels, the determination of the word boundary can be optimized. For example, the signal/noise ratio to be selected at the first step 301 in FIG. 6 may be varied in successive iterations by gradually increasing noise levels to reduce the signal/noise ratio, such as:

S/N=∞, +40 dB, +35 dB, +30 dB, +20 dB, +15 dB, +10 dB, +8 db, +5 dB, +3 dB, 0 dB along a curve shown in FIG. 7. Here, the first signal/noise level to be selected need not necessarily be ∞, but can be a finite value such as +20 dB. Alternatively, the noise levels may be distributed statistically around a prescribed average noise level. For this reason, there is a step 306 in the flow chart of FIG. 5, which repeats the cycle of learning process with different noise levels until all choices are covered.

Figure 8:
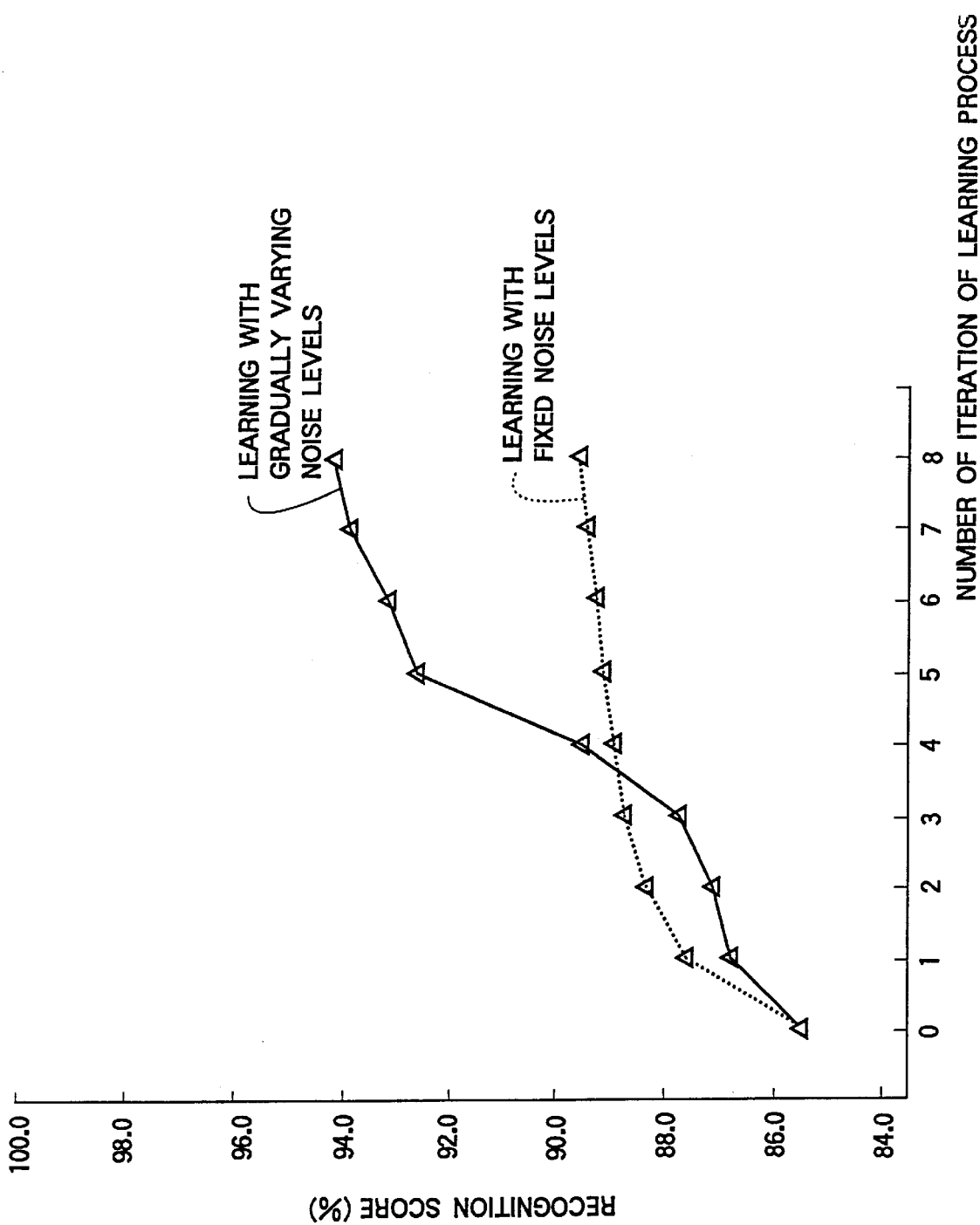
FIG. 8 is a graph showing the results of speech recognition experiments using the apparatus of FIG. 2 with iterated learning, gradually varying noise levels and fixed noise levels.

The effect of such iterations with gradually varying noise levels can be seen from the results of speech recognition experiments performed by the apparatus of this embodiment using iterated learning with gradually varying noise levels and with fixed noise levels, shown in FIG. 8. As shown, the recognition score improves much faster for iterated learning with gradually varying noise levels such that after 8 iterations there is a 4.6% difference between the iterated learning with gradually varying noise levels and with fixed noise levels.

Thus, in this embodiment, the word feature vector for learning as well as the start and end points of the speech pattern can automatically be determined by subjecting the artificially synthesized noisy speech data to the word spotting method of speech recognition, so that it is possible to realize a so called "noise immune" system of learning in which the variations of the speech pattern due to noise are completely taken into account in the process of learning, which in turn assures highly accurate performance of the apparatus in the speech recognition mode of operation. The use of a statistical distance measure such as the multiple similarity is preferable in this regard, as various types of noises can be dealt with by changing the statistical distribution of the noise levels in the successively iterated learning processes. The iterated learning with gradually varying noise levels is particularly effective in this embodiment.

Moreover, the present invention is particularly effective when the learning is conducted in real time at an actual location of the apparatus. That is, noise data may be taken directly from the actual environment in which the apparatus is used, instead of artificially prepared noise data in the noise database, and the learning may be carried out in real time as the noise data are collected, so that the system can reflect the actual environmental conditions surrounding the apparatus. To facilitate such real time learning, a rather large amount of calculations are necessary for signal processing, word spotting, KL expansion etc., but this can be accommodated by utilizing highly advanced recent vector processors and parallel processors.

It is to be noted that when the statistical distance measure other than multiple similarity, such as the Mahalanobis distance, maximum likelihood method, subspace method, or neural network, is utilized, the details of the recognition and learning processes as described above for the multiple similarity have to be modified accordingly. However, regardless of the statistical distance measure utilized, the present invention can effectively be adapted by subjecting the artificially synthesized noisy speech data to the word spotting method of speech recognition in which the word boundary is unfixed, in order to obtain word feature vectors for learning, and by iterating such a learning process for a number of different noise levels in order to optimize the determination of the word boundary.

It is also to be noted that the present invention may be adapted to deal with the variations of the speech pattern other than those due to external noises, as described above, such as those of level fluctuation, or deformation due to communication lines or communication equipment.

The present invention may be adapted to deal with speech data of a particular designated speaker alone, in which the speech data of the other speakers will not be recognizable.

The speech recognition apparatus of the present invention may also be utilized to obtain raw data for further post processing and language processing in which the recognition result as well as the start and end points of the recognition result are utilized, such as the recognitions of word or speech sequences.

In addition to the learning process of the above embodiment, it is beneficial to additionally perform learning in the manner of so-called competitive learning in which the covariance matrix $K^{(m)}$ for each word m is subjected to additional modification according to the formula:

$$K^{(m)} = K_\phi^{(m)} - \beta \Sigma X^{(l)} X^{(l)T}, (m \approx l)$$

where $K_\phi^{(m)}$ is an original covariance matrix before this modification, $\beta$ is another coefficient, $X^{(l)}$ is a word feature vector for learning for a word l, and $X^{(l)T}$ is a transpose of $X^{(l)}$.

Furthermore, the word sequence recognition or speech sequence recognition can also be performed in the present invention in addition to the word recognition described above.

Moreover, the present invention can be adapted to deal with recognition of time series signals other than speech recognition, such as acoustic or vibrational signals, in general. More specifically, such diverse applications of the present invention as the detection of the acoustic vibrational signal due to malfunctioning ball bearing, the detection of an abnormal engine noise, speaker matching, speaker identification, the recognition of a cannon firing, a seismometer, fire detection sensor etc. can easily be envisaged.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for time series signal recognition, comprising:
    means for inputting signal patterns for time series signals to be recognized;
    means for recognizing the time series signals according to a word spotting scheme using continuous pattern matching, including:
        means for extracting a plurality of candidate feature vectors for characterizing an individual time series signal from the signal patterns;
        recognition dictionary means for storing reference patterns with which the individual time series signals are matched;
        means for calculating similarity values for each of the extracted candidate feature vectors and the reference patterns;
        means for determining a recognition result by selecting one of said stored reference patterns that matches with one of the candidate feature vectors by the continuous pattern matching for which the similarity value calculated by the calculating means is greater than a prescribed threshold value; and
    means for learning new reference patterns to be stored in the recognition dictionary means, including:
        means for mixing speech patterns with noise database patterns representing background noises, to form signal patterns for learning, and supplying the signal patterns for learning to the recognizing means;
        means for extracting feature vectors for learning from the recognition results and the similarity values obtained by the recognizing means using the signal patterns for learning; and
        means for obtaining new reference patterns from the feature vectors for learning extracted by the extracting means and storing the obtained new reference patterns in the recognition dictionary means.

2. The apparatus of claim 1, wherein learning by the learning means is iterated for a number of different noise levels for the noise database patterns mixed with the speech patterns.

3. The apparatus of claim 2, wherein the number of different noise levels are derived by gradually changing a noise level of background noises represented by the noise database patterns.

4. The apparatus of claim 2, wherein the number of different noise levels are derived by statistically distributing various noise levels for the background noises represented by the noise database patterns.

5. The apparatus of claim 1, wherein the similarity values are calculated by utilizing a statistical distance measure.

6. A method for time series signal recognition, comprising the steps of:
    a) inputting signal patterns for time series signals to be recognized;
    b) recognizing the time series signals according to a word spotting scheme using continuous pattern matching, including the steps of:
        i) extracting a plurality of candidate feature vectors for characterizing an individual time series signal from the signal patterns;
        ii) calculating similarity values for each of the extracted candidate feature vectors and reference patterns in a recognition dictionary;
        iii) determining a recognition result by selecting one of said stored reference patterns that matches with one of the extracted candidate feature vectors by the continuous pattern matching for which the similarity value calculated at the calculating step is greater than a prescribed threshold value; and
    c) learning new reference patterns to be stored in the recognition dictionary, including the steps of:
        i) mixing speech patterns with noise database patterns representing background noises, to form signal patterns for learning, and carrying out the recognizing step b) using the signal patterns for learning;
        ii) extracting feature vectors for learning from the recognition results and the similarity values obtained by the recognizing step b) using the signal patterns for learning;
        iii) obtaining new reference patterns from the feature vectors for learning extracted by the extracting step c) ii); and
        iv) storing the new reference patterns in the recognition dictionary.

7. The method of claim 6, wherein learning at the learning step is iterated for a number of different noise levels for the noise database patterns mixed with the speech patterns.

8. The method of claim 7, wherein the number of different noise levels are derived by gradually changing a noise level of the background noises represented by the noise database patterns.

9. The method of claim 7, wherein the number of different noise levels are derived by statistically distributing various noise levels for the background noises represented by the noise database patterns.

10. The method of claim 6, wherein the similarity values are calculated by utilizing a statistical distance measure.

11. An apparatus for time series signal recognition, comprising:
means for inputting signal patterns for time series signals to be recognized, said signal patterns representing words in the time series signals to be recognized;
means for recognizing the words in the time series signals according to a word spotting scheme using continuous pattern matching, including:
means for extracting n candidate feature vectors $x_{ij}$, where j is an integer from 1 to n, n being an integer greater than 1, for characterizing an individual time series signal from the signal patterns, the n candidate feature vectors being extracted based on a corresponding time frame of the individual time series signal that starts at a time $t_j$ and ends at a time $t_i$, where $t_j < t_{j+1} < t_i$;
recognition dictionary means for storing reference patterns with which the individual time series signals are matched;
means for comparing the stored reference patterns with the extracted candidate feature vectors $x_{ij}$;
means for calculating similarity values for each of the extracted candidate feature vectors $x_{ij}$ and the reference patterns;
means for determining a recognition result by selecting one of said stored reference patterns that matches with one of the candidate feature vectors $x_{ij}$ by the continuous pattern matching for which the similarity value calculated by the calculating means is greater than a prescribed threshold value; and
means for learning new reference patterns to be stored in the recognition dictionary means, including:
means for mixing speech patterns with noise database patterns representing background noises, to form signal patterns for learning, and supplying the signal patterns for learning to the recognizing means;
means for extracting feature vectors for learning from the recognition results and the similarity values obtained by the recognizing means using the signal patterns for learning; and
means for obtaining new reference patterns from the feature vectors for learning extracted by the extracting means and storing the obtained new reference patterns in the recognition dictionary means.

12. The apparatus of claim 11, wherein a word is spotted having a time period $t_r$–$t_j$ by the recognizing means, as a result of the determining means determining the one of the candidate feature vectors $x_{rj}$ which corresponds to a candidate feature vector having a corresponding time frame of the individual time series signal that starts at a time $t_r$ and ends at the time $t_j$, where $1 < r < j$.

13. The apparatus of claim 12, wherein each of the stored reference patterns has a different predetermined frequency versus time characteristic, and
wherein each of the n candidate feature vectors $x_{ij}$ has a frequency versus time characteristic which is compared with the different predetermined frequency versus time characteristics of the stored reference patterns.

14. The apparatus of claim 13, wherein the word spotting scheme of the recognizing means determines a word boundary having a starting time corresponding to the time $t_r$ and an ending time corresponding to the time $t_j$ at a time the determining means determines the one of the candidate feature vectors $x_{rj}$.

15. The apparatus of claim 14, wherein each of the n candidate feature vectors $x_{ij}$ has an (m×m)-dimensional characterization of frequency versus time, wherein a frequency range is divided into m frequency slots and a time range is divided into m time slots, the m frequency slots of each of the n candidate feature vectors $x_{ij}$ being identical, the m time slots of each of the n candidate feature vectors $x_{ij}$ being based on the integer j.

* * * * *

UNITED STATES PATENT AND TRADEMARK OFFICE
CERTIFICATE OF CORRECTION

PATENT NO. : 6,178,399 B1
DATED : January 23, 2001
INVENTOR(S) : Yoichi Takebayashi et al.

It is certified that error appears in the above-identified patent and that said Letters Patent is hereby corrected as shown below:

<u>Title page,</u>
Item [30], Foreign Application Priority, delete "March 13, 1989 [JP] 1-057878" and insert -- March 13, 1989 [JP] 1-057978 --

Signed and Sealed this

Second Day of July, 2002

Attest:

Attesting Officer

JAMES E. ROGAN
*Director of the United States Patent and Trademark Office*